Patented Mar. 14, 1933

1,901,387

UNITED STATES PATENT OFFICE

KARL WIEDEMANN, OF LEVERKUSEN-I. G. WERK, AND HEINRICH CLINGESTEIN, OF COLOGNE-ON-THE-RHINE, GERMANY, ASSIGNORS TO GENERAL ANILINE WORKS, INC., OF NEW YORK, N. Y., A CORPORATION OF DELAWARE

AZODYESTUFFS

No Drawing. Application filed March 2, 1932, Serial No. 596,404, and in Germany March 9, 1931.

The present invention relates to new azodyestuffs, more particularly it relates to azodyestuffs which may be represented by the probable general formula:

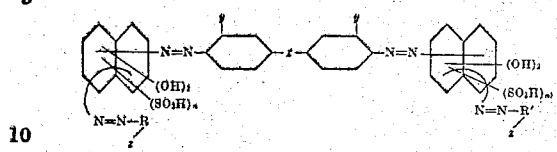

wherein "—$x$—" stands for a carbon-carbon linkage or for the urea bridge —NH—CO—NH—, "$y$" stands for the carboxylic acid group or for an alkoxy group, such as methoxy, ethoxy, isopropyloxy and the like, "$z$" stands for the carboxylic acid group or for an alkoxy group, "R" and "R'" stands for radicals of the benzene or naphthalene series, the substituents "$z$" being attached to "R" or "R'" respectively in ortho-position to the azo-group, each azo-group being attached to the respective hydroxy-naphthalene-sulfonic acid radical in ortho-position to a hydroxy group, and "$n$" and "$n'$" stand for the numbers one or two.

Our new azodyestuffs are obtainable by tetrazotizing in the usual manner one molecular proportion of a 4.4'-diaminodiphenyl which is substituted in the 3- and 3'-position by carboxylic acid or alkoxy groups or a corresponding 4.4'-diaminodiphenylurea compound, coupling in an alkaline medium with two molecular proportions of a similar or dissimilar dihydroxynaphthalene-mono- or -disulfonic acid and coupling the disazodyestuff thus obtained with two molecular proportions of a similar or dissimilar diazotized amine of the benzene or naphthaline series containing in ortho-position to the diazotized amino group an alkoxy or carboxy group. These o-alkoxy or o-carboxy amines of the benzene or naphthalene series may be further substituted in the nucleus, for example by alkyl, halogen and the sulfonic acid group.

Our new dyestuffs are in form of their alkali metal salts dark powders, soluble in water, dyeing the vegetable fibre reddish- to greenish-grey shades. By after-treating the dyestuffs in substance or on the fibre with an agent yielding copper they form copper complex compounds, yielding shades of excellent fastness to light.

The invention is illustrated by the following examples, without being limited thereto:

*Example 1.*—244 parts by weight of 4.4'-diamino-3.3'-dimethoxydiphenyl are tetrazotized and coupled with 672 parts by weight of 1.5-dihydroxynaphthalene-3.7-disulfonic acid. The isolated dyestuff is dissolved in about 13,000 parts by weight of water and coupled in an ice-cold soda alkaline solution with the diazo compound from 213 parts by weight of 2-amino-1-anisol-4-sulfonic acid in the presence of pyridine. When the diazo compound can no more be detected the trisazodyestuff thus obtained is combined in the same medium with the diazo compound from 165.5 parts by weight of 4-chloro-2-amino-1-anisol without isolation. The tetrakisazodyestuff precipitating on the addition of common salt is soluble in water with a green coloration and dyes cotton bluish-greenish-grey shades. By after-treatment with copper sulfate yellowish-greenish-grey shades result.

When coppering the dyestuff in substance by adding 26,000 parts by weight of water, while stirring, boiling the mixture for 2 hours in an aqueous weakly acid solution from 750 parts by weight of crystallized copper sulfate and drying the isolated dyestuff thus obtained as sodium salt, cotton is dyed from an alkaline bath greenish-grey shades of good fastness to light and ironing.

In its free state the dyestuff has the following formula:

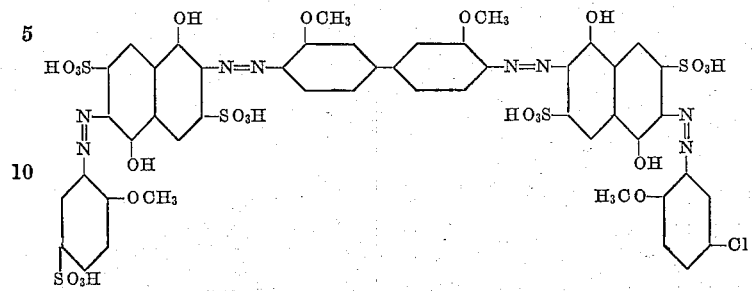

*Example 2.*—244 parts by weight of 4.4'-diamino-3.3'-dimethoxydiphenyl are tetrazotized and coupled in a bicarbonate-alkaline solution with 504 parts by weight of 2.8-dihydroxynaphthalene-6-sulfonic acid, and the isolated dyestuff is further coupled in an ice-cold sodaalkaline solution with the diazo compound from 426 parts by weight of 2-amino-1-anisol-4-sulfonic acid, while adding pyridine. On the addition of common salt the dyestuff is isolated and then dried. It is soluble in water with a dull bluish-violet coloration and dyes cotton bluish-grey shades, which on after-treatment with copper sulfate, become more reddish. In its free state the dyestuff possesses the following formula:

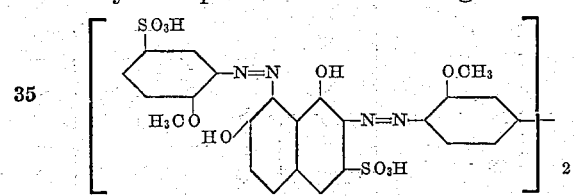

When the dyestuff is coppered in substance, as described in Example 1, cotton is dyed grey shades of excellent fastness to light.

*Example 3.*—By substituting in Example 2 the 2.8-dihydroxynaphthalene-6-sulfonic acid by the same quantity of 2.5-dihydroxynaphthalene-7-sulfonic acid, there is obtained a dyestuff which in its free state has the following formula:

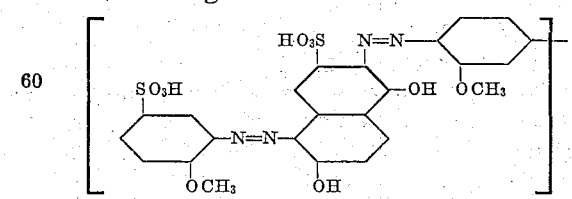

It dyes cotton more reddish shades than the dye-stuff of Example 2, which on after treatment with copper sulfate becomes still more reddish.

By dissolving the dyestuff in about 25,000 parts by weight of water, acidifying the solution, rendering the same ammoniacal, adding an aqueous ammoniacal solution prepared from 800 parts by weight of crystalized copped sulfate and heating for 2 hours at 75 to 80° C. there is formed a complex compound of the dyestuff which after isolation in the usual manner dyes cotton bluish-grey shades of very good fastness to light.

*Example 4.*—302 parts by weight of 4.4'-diamino-3.3'-dimethoxydiphenylurea are tetrazotized and coupled in a sodaalkaline solution with 504 parts by weight of 2.5-dihydroxynaphthalene-7-sulfonic acid. The disazodyestuff thus formed is isolated, again dissolved and coupled in a sodaalkaline solution with a diazo compound prepared from 426 parts by weight of 2-amino-1-anisol-4-sulfonic acid. The tetrakisazodyestuff is isolated in the usual manner. In its free state it has the probable formula:

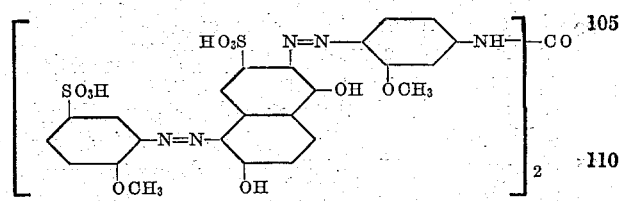

It dyes cotton violet-grey shades which by after-treatment with copper sulfate become somewhat more red.

The same dyestuff is obtainable by diazotizing 1 molecular proportion of 5-nitro-2-amino-1-anisol, coupling in an alkaline solution with 1 molecular proportion of 2.5-dihydroxynaphthalene-7-sulfonic acid, reducing with sodium sulfide to the corresponding aminoazodyestuff, phosgenating the same and coupling with 1 molecular proportion of diazotized 2-amino-1-anisol-4-sulfonic acid. Reducing and phosgenating may also be performed after the coupling with diazotized 2-amino-1-anisol-4-sulfonic acid.

When coppering the dyestuff in substance, as described in Example 3, in an ammoniacal solution, a copper complex compound of this dyestuff is obtained which dyes cotton greyish-violet shades of very good fastness to light.

By substituting the 2-amino-1-anisol-4-sulfonic acid by the 1-amino-2-naphtholmethyl (or ethyl)ether or a sulfonic acid thereof, a dyestuff having similar properties is obtained.

*Example 5.*—When coupling the diazo compound from 244 parts by weight of 4.4'-diamino-3.3'-dimethoxydiphenyl with 504 parts by weight of 2.8-dihydroxynaphthalene-6-sulfonic acid as described in Example 2, combining this disazodyestuff with the diazo compound from 436 parts by weight of 4-sulfonic acid-2-aminobenzoic acid, coppering the dyestuff in substance, as described in Example 1, or on the fibre grey shades are obtained which possess excellent fastness to light. In its free state the dyestuff has the probable formula:

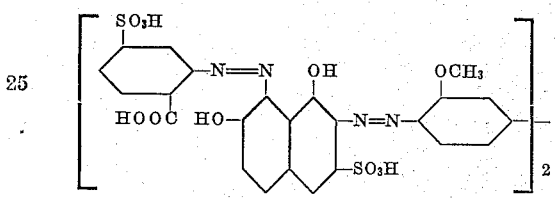

A dyestuff having similar properties is obtained by substituting the 244 parts by weight of 4.4'-diamino-3.3'-dimethoxydiphenyl by 272 parts by weight of 4.4'-diaminodiphenyl-3.3'-dicarboxylic acid.

We claim:

1. Azodyestuffs of the probable general formula:

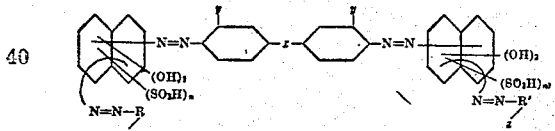

wherein "—$x$—" stands for a carbon-carbon linkage or for the urea bridge, "$y$" stands for the carboxylic acid group or for an alkoxy group, "$z$" stands for the carboxylic acid group or for an alkoxy group, "R" and "R'" stands for radicals of the benzene or nathalene series, the substituents "$z$" being attached to "R" or "R'" respectively in ortho-position to the azo-group, each azo-group being attached to the respective hydroxy-naphthalene-sulfonic acid radical in ortho-position to a hydroxy group, and "$n$" and "$n'$" stand for the numbers one or two, being in form of their alkali metal salts dark powders, soluble in water, dyeing the vegetable fibre reddish- to greenish-grey shades, which by after-treating in substance or on the fibre with copper-yielding agents form copper complex compounds.

2. The azodyestuffs of the probable general formula:

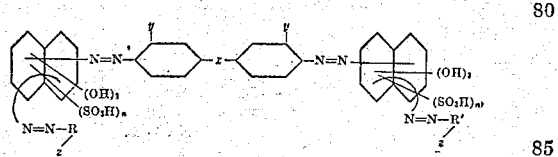

wherein "—$x$—" stands for a carbon-carbon linkage or for the urea bridge, "$y$" stands for the carboxylic acid group or for an alkoxy group, "$z$" stands for the carboxylic acid group or for an alkoxy group, "R" and "R'" stand for benzene radicals which may be further substituted by substituents of the group consisting of alkyl, halogen and the sulfonic acid group, the substituents "$z$" being attached to "R" or "R'" respectively in ortho-position to the azo-group, each azo-group being attached to the respective hydroxy-naphthalene-sulfonic acid radical in ortho-position to a hydroxy group, and "$n$" and "$n'$" stand for the numbers one or two, being in form of their alkali metal salts dark powders, soluble in water, dyeing the vegetable fibre reddish- to greenish-grey shades, which by after-treating in substance or on the fibre with copper-yielding agents form copper complex compounds.

3. The azodyestuff of the following formula:

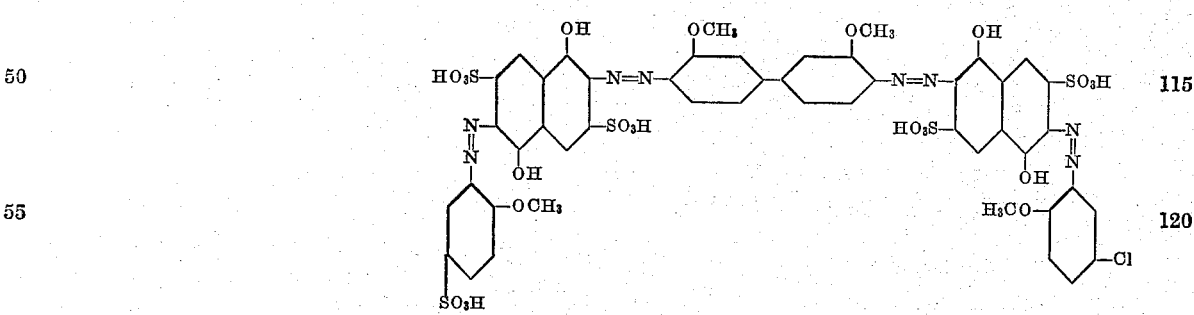

being in form of its alkali metal salts a dark, watersoluble powder, dyeing cotton bluish-greenish-grey shades, which by after-treating with copper-sulfate become yellowish-greenish-grey.

4. The azodyestuff of the following formula:

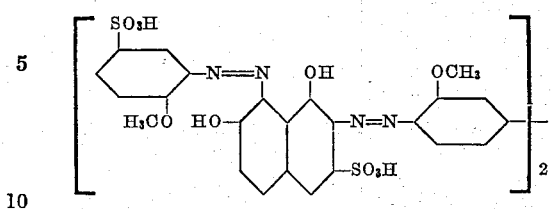

being in form of its alkali metal salts a dark, watersoluble powder, dyeing cotton bluish-grey shades, which on after-treating with copper sulfate become more reddish.

5. An azodyestuff of the following formula:

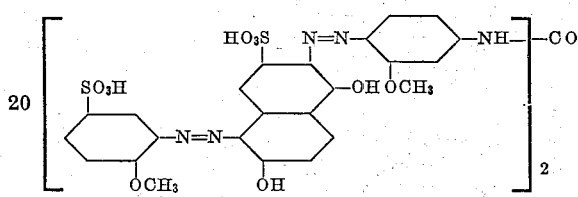

existing in the form of its alkali metal salts as a dark, watersoluble powder, dyeing cotton violet-gray shades, which on after treating with copper sulfate become more reddish.

In testimony whereof, we affix our signatures.

KARL WIEDEMANN.
HEINRICH CLINGESTEIN.